March 18, 1941.　　　　B. CAMPBELL　　　　2,235,009
MANUFACTURE OF FUSEHEADS
Filed May 11, 1938　　　2 Sheets-Sheet 1

Bryce Campbell　INVENTOR.

BY　　　　ATTORNEY.

Patented Mar. 18, 1941

2,235,009

UNITED STATES PATENT OFFICE 2,235,009

MANUFACTURE OF FUSEHEADS

Bryce Campbell, Saltcoats, Scotland, assignor to Imperial Chemical Industries Limited, a corporation of Great Britain Application May 11, 1938, Serial No. 207,409
In Great Britain May 18, 1937

3 Claims. (Cl. 86—1)

This invention relates to the manufacture of electric fuseheads and more particularly to low tension fuseheads as commonly used, for example, in blasting detonators.

A common method of manufacturing fuseheads consists in stamping out comb-like structures from a sheet of pressboard coated on each side with a sheet of metal foil, dipping the toothed edges of these combs into a paste comprising a suitable inflammable composition and a cement, subsequently severing each individual tooth together with its bead of igniting composition from the combs, and soldering an insulated connecting wire to each side of each tooth.

In the manufacture of low-tension fuseheads, before the dipping operation is carried out, a bridge of fine resistance wire is soldered across the tip of each tooth so that it connects the strips of metal foil on each side of the tooth. In order to provide a suitable length of bridge wire, and to ensure that the wire is completely embedded in the bead, the following procedure is customary. Thin pressboard coated on one side with metal foil is cut into strips of two different widths, and the pairs of assorted strips are cemented together by the board faces so that composite strips are formed, each having two steps corresponding respectively to the two edges of the narrower strip. These composite strips are then cut in two in order to form blanks having a single step and the blanks are stamped to produce two combs out of each blank. These operations are illustrated in Figures 1 and 2 of the accompanying drawings of which Figure 1 shows a front view of a blank, the dotted line indicating the manner in which it is stamped into two combs, while Figure 2 shows a section through one of the teeth of the lower comb. The combs having steps near the extremities of their teeth are then converted into low-tension fuseheads by trimming the steps to the desired length, winding the resistance wire around the comb so that it crosses the step of each tooth, soldering the bridge to the tip of the metal foil at each side, removing the unwanted portions of wire, dipping the toothed edges of the combs and completing the operations as above. The combs having plain teeth, which are formed in numbers equal to those of the stepped combs, are customarily used in the manufacture of high-tension fuseheads.

Such fuseheads have the disadvantage that they are made up of four different layers joined together and each junction is a source of weakness; further, the manufacture involves several different stages, each stage adding to the cost of manufacture. Also such steps as the gumming of the two strips together and the subsequent trimming so as to get the correct depth to the step are at present done by hand and require much skill and labour. A further disadvantage is that for each low tension fusehead it is necessary to manufacture a high tension fusehead which is a frequent source of waste.

This invention has as an object to devise a new method of manufacturing fuseheads. A further object is to device a new method of manufacturing fuseheads whereby a step for the bridge wire can be made with greater accuracy and economy than by hitherto known processes. A still further object is to devise a new method of manufacturing fuseheads whereby low tension fuseheads can be manufactured without necessarily manufacturing high tension fuseheads. A still further object is to devise a new method of manufacturing fuseheads whereby fuseheads can be made with an economy of layers of material. Further objects will appear hereinafter. These objects are accomplished by the following invention.

I have found that if I take a single layer of insulating material coated on each side with a metal layer or film and cut my comb shaped structures from this, I can cut a step in the extremity of each prong of the comb in a rebating machine without tearing the metal coating from the insulating material, or damaging the shape of the prong.

According to the present invention, therefore, a process for the manufacture of low tension electric fuseheads comprises the steps of taking a strip consisting of a single thickness of insulating material, for example, pressboard, coated on each surface with a metal layer or film, stamping out of this strip two complementary comb-like structures and passing each comb-like structure through a machine which will cut a step in the extremity of each prong.

The invention is illustrated in Figures 3, 4 and 5 of the accompanying drawings.

Figure 1:
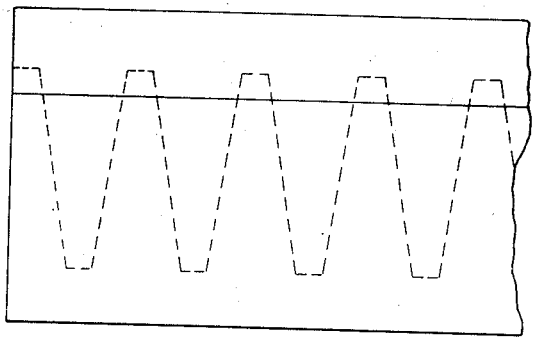
Figure 2:
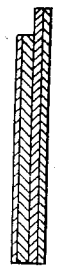
Figure 3:
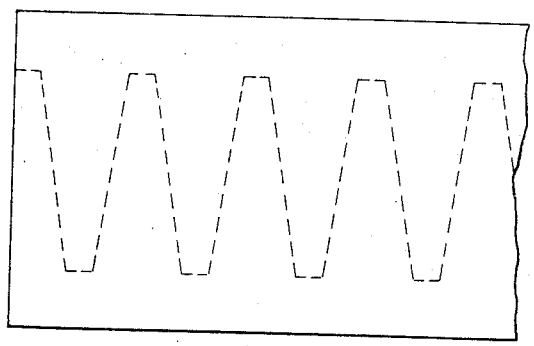
Figures 3 and 4 show the front view and end section respectively of a blank of pressboard coated with metal foil and the dotted lines in Figures 3 indicate the manner in which two combs of connected triangular elements are stamped from each blank.
Figure 4:
Figure 5:
Figure 5 is a section through one of the teeth after the rebating operation showing the manner in which the step has been cut in the extremity of the element.
Figure 6:
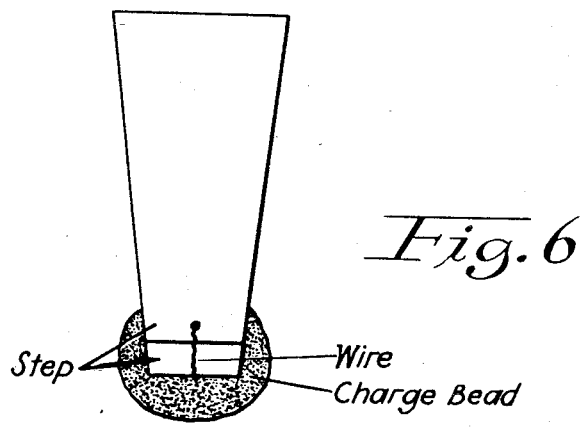
Figure 6 is a front view of a tooth of the comb after the step has been cut therein, the bridge wire has been soldered thereon and the tip has been covered with a bead charge.
Figure 7:
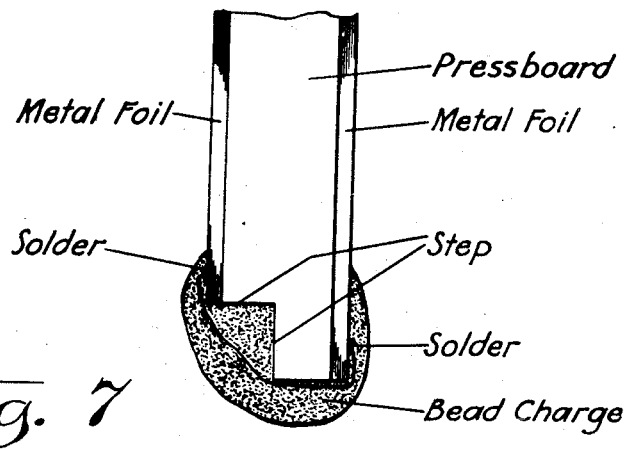
Figure 7 is a section through a beaded wired cut tip of a tooth.

The invention is further illustrated by the following example.

*Example*

The fusehead combs are stamped from sheets of pressboard 0.034" thick coated on each side with brass foil 0.0015" thick. Each comb is 5" long and has 20 teeth at equal intervals, each tooth being 0.079" broad at the tip.

The combs are fed in succession, by spur gears working in their teeth, along a horizontal channel and under a milling cutter, which is so set that the step cut out of each tooth is 0.014" deep and 0.040" back from the tip. The cutter is 2½" diameter, runs at 1440 R. P. M., and has 62 teeth. The combs are fed at such a rate that 70 teeth are rebated per minute. The movement of the comb under the cutter is in the same sense as that of the periphery of the cutter. The cleaning brush rotates at the same speed as the cutter, and brushes towards the tip of the tooth.

After passing the comb-shaped structure through the rebating machine it is sometimes advantageous to pass it under a brush moving at high speed so as to remove any fibres or metal particles from the pressboard surfaces at the tip of the teeth.

Metal coated strips in which the metal foil is attached to the pressboard sheet by means of a thermoplastic cement are especially useful in this invention. By this means low tension fuseheads can be manufactured with a perfect bond between the board faces over the whole contact area of the stepped blank stamped from the composite strip which can be maintained in perfect condition throughout the manufacturing operations and subsequent storage, whereas by earlier known methods such bond occasionally failed.

The coating of metal foil may be applied over only a part of the one surface of the blank so that the area where the step is to be formed is left uncovered. Alternatively the metal foil may be applied over the whole of both surfaces of the blank so that in the subsequent rebating operation the appropriate section of the foil is cut away as well as part of the insulating material beneath. Contrary to what might have been expected this operation can be conducted in a single stage without any special precautions to avoid tearing or distortion of the remainder of the metal foil. Furthermore, the manufacture can now be done with accuracy by machine and it is no longer necessary to manufacture simultaneously equal numbers of stepped and plain combs.

As many apparently widely different embodiments of this invention may be made without departing from the spirit and scope thereof, it is to be understood that the invention is limited to the specific embodiments thereof except as defined in the appended claims.

I claim:

1. A method of manufacturing low tension electric fuseheads which comprises stamping a unitary single thickness pressboard sheet coated on both sides with metal into two complementary combs and converting both of said combs into individual fuseheads by cutting a step on one side of the tip of each tooth of the combs, connecting a bridge wire across said step, dipping the wired teeth of each of said combs into an ignition mix to form beads on said wired tips, and severing the teeth of said combs.

2. In the manufacture of electric fuseheads by the process which includes forming metal coated combs, wiring the ends of the teeth thereof, dipping the wired ends and beading with ignition mix, the step which comprises stamping a unitary single thickness pressboard sheet coated on both sides with metal into two complementary combs and converting both combs into fuseheads.

3. A method of manufacturing low tension electric fuseheads which comprises stamping a unitary single thickness pressboard sheet coated on both sides with metal into two complementary combs and converting both of said combs into individual fuseheads by cutting a step on one side of the tip of each tooth of the combs, connecting a bridge wire across said step by winding the resistance wire so that it crosses the step of each tooth, soldering the resultant bridge to the tip of the metal at each side of the comb, and removing the portions of wire intervening between the teeth, dipping the wired teeth of each of said combs into an ignition mix to form beads on said wired tips, and severing the teeth of said combs.

BRYCE CAMPBELL.